(12) United States Patent
Coppard et al.

(10) Patent No.: US 8,153,881 B2
(45) Date of Patent: Apr. 10, 2012

(54) DISC JOCKEY VIDEO GAME AND CONTROLLER

(75) Inventors: Nathan Coppard, Leamington Spa (GB); Lee Guinchard, Mountain View, CA (US); Phillip Hindle, Leamington Spa (GB); Jamie Jackson, Leamington Spa (GB); Lee Yat Lam, Mountain View, CA (US); Chan Yuk On, Mountain View, CA (US); David Osbourn, Leamington Spa (GB); Neil Wigfield, Leamington Spa (GB); Stephen N. Withers, Mountain View, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 162 days.

(21) Appl. No.: 12/390,404

(22) Filed: Feb. 20, 2009

(65) Prior Publication Data

US 2010/0216547 A1    Aug. 26, 2010

(51) Int. Cl.
*G10H 1/00* (2006.01)
(52) U.S. Cl. ............................... 84/615; 84/653; 84/626
(58) Field of Classification Search ............ 84/600–602, 84/615, 626, 653, 662, 743, 618, 624, 656
See application file for complete search history.

(56) References Cited

U.S. PATENT DOCUMENTS

| | | | |
|---|---|---|---|
| 5,399,799 | A | 3/1995 | Gabriel |
| 5,824,933 | A | 10/1998 | Gabriel |
| 5,915,288 | A | 6/1999 | Gabriel |
| 6,234,479 | B1 | 5/2001 | Watanabe et al. |
| 6,252,153 | B1 | 6/2001 | Toyama |
| 6,379,244 | B1 | 4/2002 | Sagawa et al. |
| 6,461,239 | B1 * | 10/2002 | Sagawa et al. .................... 463/7 |
| 6,484,942 | B1 | 11/2002 | Yokoyama et al. |
| 6,545,953 | B1 | 4/2003 | Herbert |
| 6,554,711 | B1 | 4/2003 | Kawasaki et al. |
| 6,582,309 | B2 | 6/2003 | Higurashi et al. |
| 6,607,446 | B1 | 8/2003 | Shimomura et al. |
| 6,609,979 | B1 | 8/2003 | Wada |
| 6,656,049 | B1 | 12/2003 | Masaki et al. |
| 6,769,689 | B1 * | 8/2004 | Shimomura et al. ...... 273/148 B |
| 6,821,203 | B2 | 11/2004 | Suga et al. |
| 6,905,413 | B1 | 6/2005 | Terao et al. |

(Continued)

FOREIGN PATENT DOCUMENTS

GB    2434024 A  *  7/2007

(Continued)

OTHER PUBLICATIONS

Leahy; "Scratch: the Ultimate DJ First Impressions"; http://g4tv.com/thefeed/blog/post/694193/Scratch-The-Ultimate-DJ-First-Impressions.html; Mar. 20, 2009.

(Continued)

*Primary Examiner* — David S. Warren
(74) *Attorney, Agent, or Firm* — Klein, O'Neill & Singh, LLP

(57) ABSTRACT

A disc jockey music-based video game with a controller for the same. The disc jockey music-based video game presents instructive cues for manipulation of the controller and evaluates game player's performance based on the player's compliance with the instructive cues. A display with visual indicators of instructive cues and visual indicators representing player performance may be provided. Additionally, other forms of game player feedback may be provided, for example music, simulated crowd response other forms of generally auditory cues.

24 Claims, 13 Drawing Sheets

U.S. PATENT DOCUMENTS

| | | | |
|---|---|---|---|
| 6,945,871 B2 | 9/2005 | Uenishi et al. | |
| 6,975,995 B2 * | 12/2005 | Kim | 704/278 |
| 7,070,500 B1 | 7/2006 | Nomi et al. | |
| 7,087,830 B2 * | 8/2006 | Kent et al. | 84/645 |
| D553,608 S * | 10/2007 | Williamson et al. | D14/168 |
| D553,641 S * | 10/2007 | Williamson et al. | D14/496 |
| D559,916 S | 1/2008 | Sakai | |
| 7,401,345 B2 * | 7/2008 | Liu | 720/695 |
| D615,595 S * | 5/2010 | Williamson et al. | D21/328 |
| D621,882 S * | 8/2010 | Williamson et al. | D21/328 |
| 7,785,199 B2 * | 8/2010 | Nishimura et al. | 463/31 |
| D624,053 S * | 9/2010 | Williamson et al. | D14/217 |
| 2003/0014262 A1 * | 1/2003 | Kim | 704/278 |
| 2003/0029305 A1 * | 2/2003 | Kent et al. | 84/645 |
| 2005/0162402 A1 | 7/2005 | Watanachote | |
| 2005/0176502 A1 * | 8/2005 | Nishimura et al. | 463/31 |
| 2007/0050059 A1 * | 3/2007 | Liu | 700/94 |
| 2007/0050060 A1 * | 3/2007 | Liu et al. | 700/94 |
| 2007/0057922 A1 * | 3/2007 | Schultz et al. | 345/173 |
| 2007/0083820 A1 | 4/2007 | Blythe et al. | |
| 2007/0143772 A1 * | 6/2007 | Liu | 720/695 |
| 2007/0227337 A1 | 10/2007 | Yoshikawa et al. | |
| 2007/0243915 A1 | 10/2007 | Egozy et al. | |
| 2007/0245881 A1 | 10/2007 | Egozy et al. | |
| 2007/0273649 A1 * | 11/2007 | Matsui et al. | 345/162 |
| 2007/0274181 A1 * | 11/2007 | Yao | 369/47.38 |
| 2007/0280489 A1 * | 12/2007 | Roman et al. | 381/119 |
| 2008/0013756 A1 * | 1/2008 | Roman et al. | 381/119 |
| 2008/0013757 A1 | 1/2008 | Carrier | |
| 2008/0046098 A1 | 2/2008 | Corbin et al. | |
| 2008/0113698 A1 | 5/2008 | Egozy | |
| 2008/0113797 A1 | 5/2008 | Egozy | |
| 2008/0121092 A1 * | 5/2008 | Drel et al. | 84/612 |
| 2008/0144478 A1 | 6/2008 | Frederick et al. | |
| 2008/0311969 A1 | 12/2008 | Kay et al. | |
| 2008/0311970 A1 | 12/2008 | Kay et al. | |
| 2009/0075711 A1 | 3/2009 | Brosius et al. | |
| 2009/0088249 A1 | 4/2009 | Kay et al. | |
| 2009/0093302 A1 * | 4/2009 | Holloway et al. | 463/31 |
| 2009/0098918 A1 | 4/2009 | Teasdale et al. | |
| 2009/0104956 A1 | 4/2009 | Kay et al. | |
| 2009/0258686 A1 * | 10/2009 | McCauley et al. | 463/7 |
| 2009/0258700 A1 * | 10/2009 | Bright et al. | 463/31 |
| 2009/0285563 A1 * | 11/2009 | Endo et al. | 386/96 |
| 2010/0014390 A1 * | 1/2010 | Flum | 369/4 |
| 2010/0027967 A1 * | 2/2010 | Yamada | 386/85 |
| 2010/0216547 A1 * | 8/2010 | Coppard et al. | 463/31 |

FOREIGN PATENT DOCUMENTS

| | | |
|---|---|---|
| JP | 11-151380 | 6/1999 |
| JP | 2000-084251 | 3/2000 |
| JP | 2001-198353 | 7/2001 |
| JP | 2002-018131 | 1/2002 |
| JP | 2002-126346 | 5/2002 |

OTHER PUBLICATIONS

Photograph of what is believed to be a controller for the Beatmania game by Konami.

Beatmania Flyer p. 1 by Konami; 1997.

Beatmania Flyer p. 2 by Konami; 1997.

HipHopMania Flyer p. 1 by Konami; 1997.

HipHopMania Flyer p. 2 by Konami; 1997.

Malloc; "New DJ Game Complete with DJ Turntable-Style Controller Peripheral Announced"; MaxConsole; http://www.maxconsole.net/?mode=news&nesid=32405; Oct. 7, 2008.

International Search Report on corresponding PCT application (PCT/US2010/024876) from International Searching Authority (KR) dated Oct. 15, 2010.

Written Opinion on corresponding PCT application (PCT/US2010/024876) from International Searching Authority (KR) dated Oct. 15, 2010.

\* cited by examiner

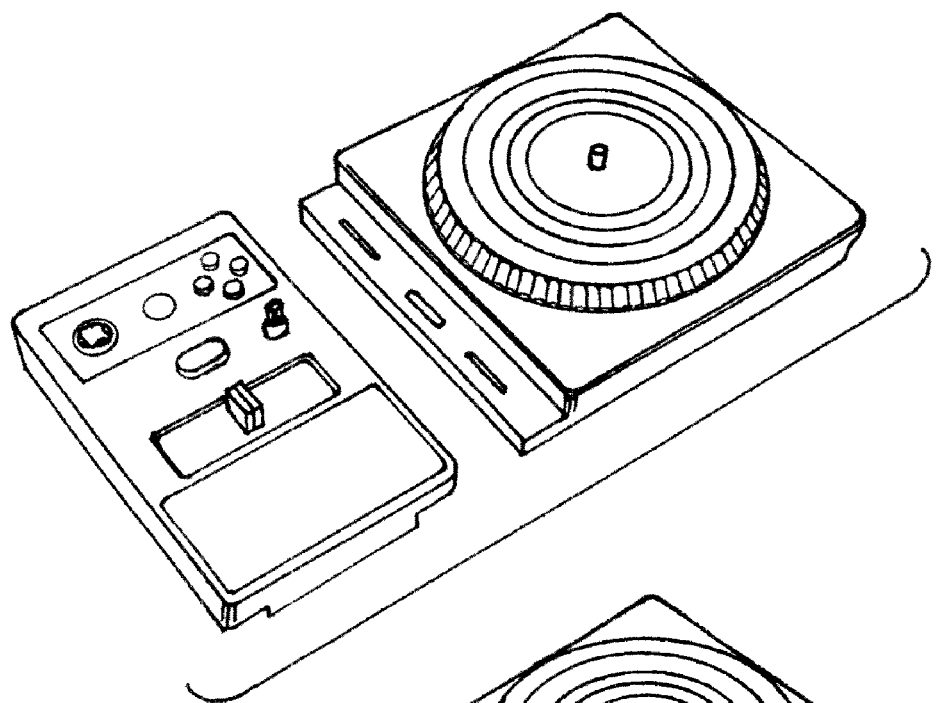
FIG. 7a
FIG. 7b
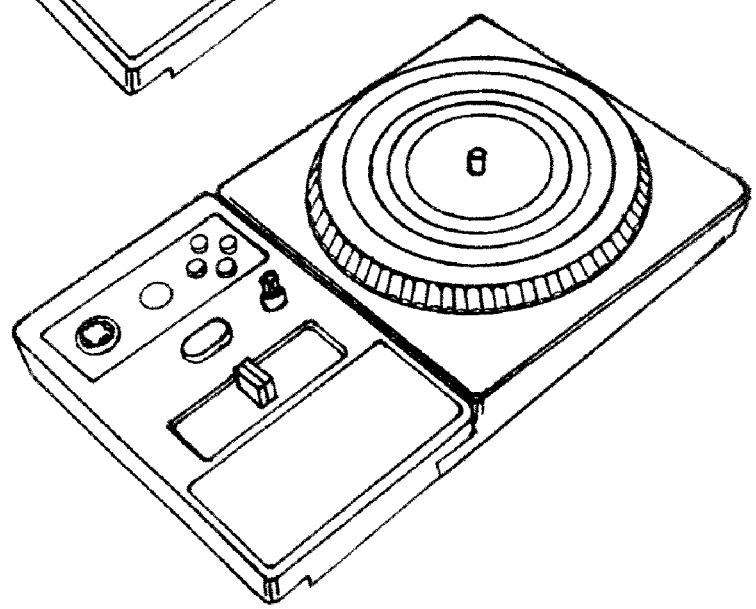
FIG. 7c
FIG. 7

DISC JOCKEY VIDEO GAME AND CONTROLLER

BACKGROUND OF THE INVENTION

The present invention relates generally to video games, and more particularly to music-based video games and controllers for use with same.

Generally video games are played by game players operating controllers, with the game players operating the controllers by depressing buttons or manipulating other inputs of the controllers responsive to particular display presentations. The display presentations may relate generally to activities that occur in the real world, at least for some, or be entirely fanciful. In either case video games allow game players to experience simulated activities, at least to an extent, that the game players may otherwise be unable or incapable of otherwise take part in.

In many instances the controllers are generic controllers, including input devices adapted for use with a wide variety of video games. The use of generic controllers is convenient, allowing a game player to use a single controller with a wide variety of video games. The use of generic controllers may, however, detract from the experience of a simulated activity, considering that a generic controller may not in fact be utilized in the activities being simulated.

Music-based video games are popular with some game players. Music-based video games often present instructive cues for manipulation of buttons and the like on a controller, with the video game generally providing music and increasing a game player score if the game player complies with the instructive cues. In addition, a simulated crowd response may be provided, with the response of the crowd varying depending on extent of compliance by the game player with the instructive cues. Further, in many cases, the controller is generally configured similar to a musical instrument, increasing realism of the simulated activity of playing a song.

Controllers and game play for simulating some such music-based video games, however, may not sufficiently present to a game player a realistic experience of participating in a music endeavor, and there may be difficulties in providing an enjoyable game playing experience with some simulated music related game controllers.

BRIEF SUMMARY OF THE INVENTION

The invention provides a disc jockey related music-based video game and also provides a controller for the same. Aspects of the invention provides a DJ controller for a video game utilizing a single turntable with surface mounted actuators. In some aspects of the invention the single turntable represents utilization of two turntables.

In one aspect the invention provides a music-based video game system, comprising: a display; a video game controller including: a rotatable platter on a housing; at least one input device carried by the platter; a processor configured by program instructions to command generation on the display of a visual interface of a music based video game, the program instructions including instructions for: providing instructive cues arranged in correspondence with a musical piece on the visual interface prompting a video game player to operate the video game controller; processing an input signal indicative of operation of the video game controller; commanding generation of a visual interface based in part on the input signals indicative of operation of the video game controller.

In another aspect of the invention, the invention provides a music based video game system, comprising: a display; a video game controller including: a turntable; a plurality of input devices on or extending through a surface of the turntable; a linear input device; a processor configured by program instructions to command generation on the display of a visual interface of a music based video game, the program instructions including instructions for: commanding display of instructive cues arranged in correspondence with a musical piece on the visual interface, at least some of the instructive cues prompting the video game player to manipulate the turntable, the plurality of input devices and the linear input device; processing input signals indicative of operation of the video game controller; commanding display of the visual interface based in part on the input signals indicative of operation of the video game controller.

In another aspect of the invention, the invention provides a video game controller comprising: a rotatable platter on a housing; at least one input device carried by the platter; circuitry to communicate an indication of the status of the at least one input device.

In another aspect of the invention, the invention provides a method of simulating a multi-turntable disc jockey deck in a music-based video game with a single turntable video game controller comprising: providing a plurality of streams of audio data, at least two of the streams of audio data representative of different musical pieces; selecting of the streams of audio data, or another of the streams of audio data or both of the streams of audio data for play based on an input of the video game controller having a single turntable; and presenting at least some audio to a game player, the at least some audio formed of the selected stream or streams.

These and other aspects of the invention are more fully comprehended upon review of this disclosure.

BRIEF DESCRIPTION OF THE FIGURES

FIG. 7 is an embodiment of a disc jockey deck shaped video game controller with detachable mixer and rotatable platter housings in accordance with aspects of the invention;

DETAILED DESCRIPTION

Figure 1:
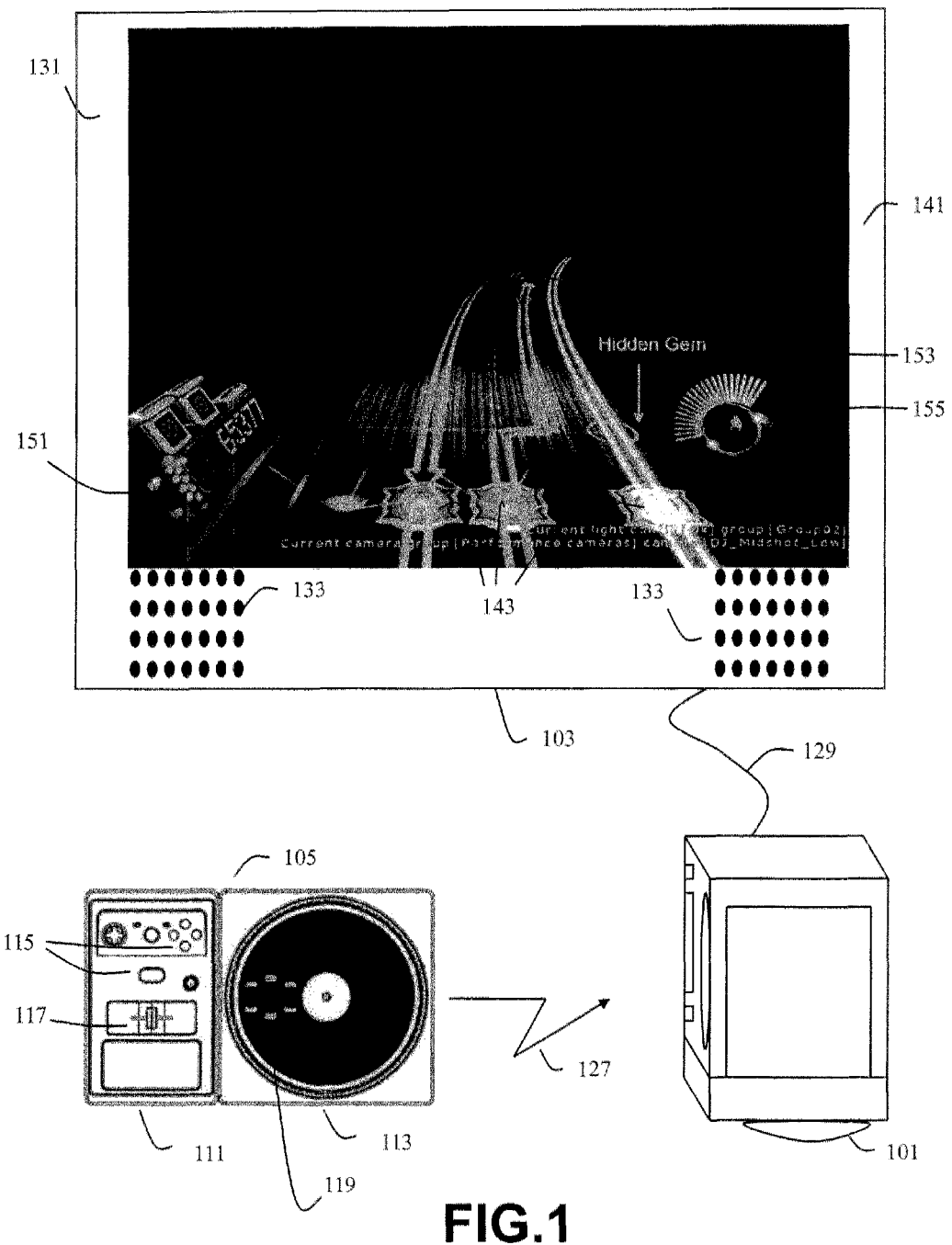
FIG. 1 illustrates an example of a video game system in accordance with aspects of the invention.

FIG. 1 is an example of a video game system in accordance with aspects of the invention. The video game system includes a video game console 101, a display 103, and a controller 105. The video game console includes internal circuitry which allows the console to run a video game by executing various program instructions related to proper execution of the video game. The video game console typically includes one or more processors, memory, and various interface circuitry. The program instructions for the video game are generally found on a removable memory source such as a video game DVD-ROM, inserted into a removable memory interface of the video game console. In some embodiments of the invention, the video game console may alternatively be a handheld gaming device, including similar internal circuitry as herein described, as well as, for example, a built in display or displays and various different game player input devices, or in some embodiments the video game console may be a computer, for example a personal computer.

The video game console is coupled to the controller by a wireless connection 127, although it should be recognized that in many embodiments the controller and video game console may be coupled by a wired connection. The controller includes a rotatable platter on a housing. The rotatable platter in most embodiments has a generally flat upper surface. However, concave surfaces may be provided for example to provide tactile feedback to a game player to allow the game player to more easily locate inputs without looking at the controller. Input device or devices are carried by the platter. For example, in some embodiments, the input devices extend through the upper surface of the platter, with bases of the inputs within the platter. In some embodiments the input devices are on the upper surface of the platter, or in some embodiments within the platter. As illustrated in FIG. 1, the input devices are buttons. In other embodiments, the input devices may be touch sensitive regions, which in some embodiments may be considered buttons. In many embodiments, and also as illustrated in FIG. 1, the controller includes a further housing, with further inputs, although in some embodiments no further housing is provided and the further inputs are provided with the housing of the rotatable platter. The further inputs are generally utilized to cause or simulate cross fading, sound effects and other mixer-like inputs for a disc jockey, and the further inputs may therefore be considered mixer inputs. Similarly, the further housing maybe considered a mixer module, or if the mixer inputs are provided as part of the housing for the rotatable platter, a mixer portion of the video game controller.

In some embodiments, the mixer is coupled to a portion of the housing of a rotatable platter by way of connectors. In some embodiments the mixer has connectors on opposing sides, allowing a housing with a rotatable platter to be coupled to the connectors on either side of the mixer module. Alternatively, a housing with a rotatable platter can be coupled to the connectors on each opposing side of the mixer module. In various other embodiments other controllers may instead or additionally be used, for example generic controllers, microphones, other simulated or actual disc jockey turntable controllers, or other disc jockey controllers in the general form of other musical instruments. Circuitry within the housing or alternatively the further housing, determines status of the rotatable platter, of the input devices carried by the platter, and of the further inputs, and communicates an indication of the status to the video game console.

The video game console is also in communication with a display unit 103, generally through an audio-video cable or similar wired connection, although a wireless connection may be used in some embodiments. The display unit is typically a television, although in some embodiments a monitor may be used, with a display screen 131 and at least one audio output device, such as a speaker 133. In the embodiment of FIG. 1, the display screen shows a screen shot 141 of video game play in a music-based video game. In addition, in some embodiments, a display screen and processor could instead or in addition, be located in the controller allowing the controller to be utilized independently of a video game console system.

As illustrated in FIG. 1, the display shows a screenshot of an example music-based video game. In the particular screenshot of FIG. 1, the display includes a plurality of instructive cues. The instructive cues generally scroll across portions of the screen towards and into a predefined area of the screen, for example a screen area 143, which may be referred to as a NOW zone. The display also shows a player score 151, a hidden gem 153, and a visual indicator representing a power meter 155.

During video game play, a game player is to depress or have depressed various buttons 115 or manipulate or have manipulated various other input devices 117 such as the position of the cross fader on the mixer module of the controller responsive to the instructive cues, generally when the instructive cues reach a predefined area of the display such as the NOW zone 143. Additionally, in most embodiments, a game player is to depress or have depressed at least one of the plurality of buttons 119 or manipulate or have manipulated at least one touch-sensitive area on the rotatable platter and/or rotate the rotatable platter of the controller clockwise or counterclockwise responsive to the instructive cues, again generally when the instructive cues reach a predefined area of the display such as the NOW zone 143. In most embodiments the video game console evaluates the game player based on extent of compliance with operations commanded by the instructive cues, for example by providing a score, a simulated crowd response, and or some other feedback to the game player. In addition, the video game console generally commands presentation of audio consisting of a premixed and recorded DJ created song during video game play. In most embodiments audio of a musical selection is provided in various streams, with for example in some embodiments audio of a particular stream or streams provided, as the game player complies with the instructive cues, and silence, volume reduction or user generated sample representing a error or mistake, possibly depending on whether the game player operates incorrect input devices or does not operate any input devices, may be provided if the game player does not comply with the instructive cues.

In many embodiments, the buttons 119 (or alternatively touch-sensitive areas) of the rotatable platter 113 of the controller 105 correspond to a heads up display (HUT)) highway on the display. The HUD highway comprises a plurality of visual indicators which correspond to a plurality of audio streams. The audio streams may include music track streams and audio sample streams, for example, created and previously recorded by an actual Disc Jockey. In some embodiments, the audio may be created on the fly as a game player is playing. For example, as illustrated in FIG. 1, rotatable platter 113 is shown with 3 buttons 119 and the HUD highway comprises 3 visual indicators representing 3 audio streams with 2 of the visual indicators representing music track streams and 1 of the visual indicators representing an audio sample stream. As shown in FIG. 1, the visual indicators are in the form of a generally continuous strip or stream, with the strips following a somewhat curved pathway, representative for example of a portion of a circular curve or a record. In some embodiments, the music track streams are of at least 2 different music sources or songs. Alternatively, in some embodiments, for example with two players playing, 6 audio streams may be used, with 3 streams associated with a first player and 3 streams associated with a second player. In another embodiment, rotatable platter 113 may have 4 or more buttons corresponding to 4 or more visual indicators representing 4 or more audio streams in the game. Depressing one of the buttons 119 on the controller allows a player to perform an action related to an audio stream. In one embodiment, the rotatable platter 113 can be rotated clockwise or counterclockwise while buttons on the rotatable platter are depressed to produce predetermined sound modifications or to add additional sounds to the corresponding audio streams. For example, rotating the rotatable platter 113 clockwise then counterclockwise while depressing a button corresponding to a first audio stream may produce sound modifications or add additional sounds to the audio output and modifications to the visual indicator representing the first audio stream. In some embodiments, the modification may resemble a scratching sound effect, similar to that of a vinyl audio record being scratched by a turntable needle by moving the record forward and backward on a turntable. A highlighted stream section may indicate that a user may activate sound effects on a specific track by pressing the corresponding track buttons and manipulating a sound effects dial or other type of control.

In some embodiments, a rewind may be indicated as available by visual indicators and may be triggered, for example at a certain point in time in game play or after a game player has attained some achievement or goal during game play, when the rotatable platter 113 is rotated independent of any buttons 119 pressed, although in some embodiments rewind may be triggered through other manipulations of the controller. Rewind sets the audio streams and the visual indicators representing the audio streams to an earlier point in time in game play, with game play continuing from that point in time. This allows a player to replay a portion or portions of the audio streams, for example in a similar manner as performed by actual DJ's, and score additional points. In some embodiments, if rewind is triggered during predetermined portions of the audio streams or during portions determined during game play based on game criteria, the audio streams are set to earlier or later points in time, allowing a player to replay a longer portion or a shorter portion of the audio stream and score further points. Alternatively, the rewind section could introduce a completely new song or section, which may be complimentary to the current song.

In some embodiments, a player may continuously play through a plurality of audio tracks. For example, a player may select a plurality of audio tracks before beginning play and play through the plurality of audio tracks with a very minimal gap between the audio tracks. In some embodiments, the gap between audio tracks may be filled by simulated crowd noise, such as cheering, or other sound effects.

Figure 2:
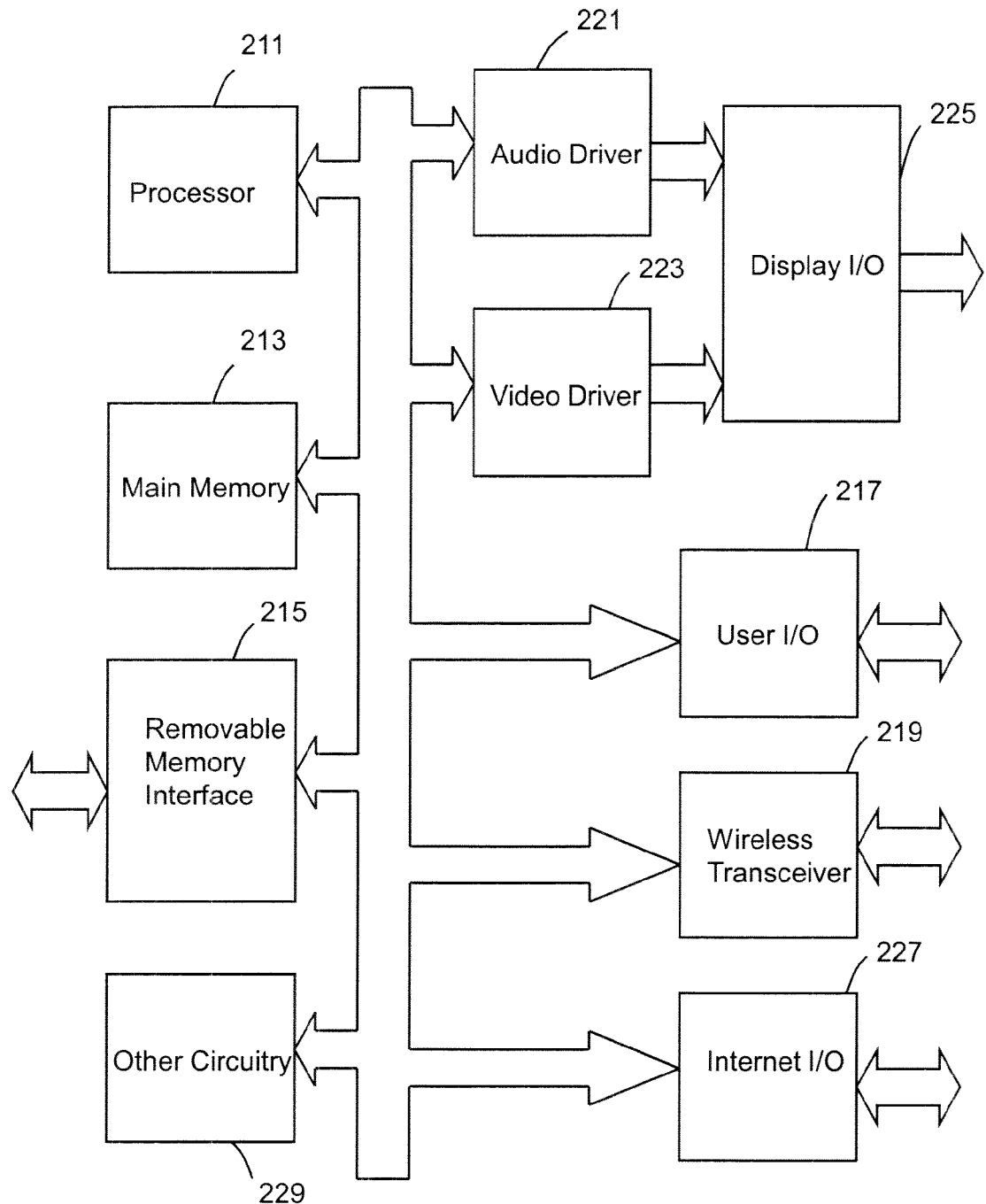
FIG. 2 is a block diagram of a video game console in accordance with aspects of the invention.

FIG. 2 is an example of a block diagram of a video game console in accordance with aspects of the invention. In the embodiment of FIG. 2, the video game console includes at least one processor 211 interconnected with other components via a system bus. The other components may include, for example, a main memory 213 of the video game console, a removable memory interface 215, a user input/output port 217, a wireless transceiver 219, an audio driver 221, a video driver 223, an Internet input/output port 227, and other circuitry 229, which may include for example an infrared sensor. In other embodiments of the invention, there may be different combinations of components that make up a video game console, depending on the individual needs of each application.

Figure 3:
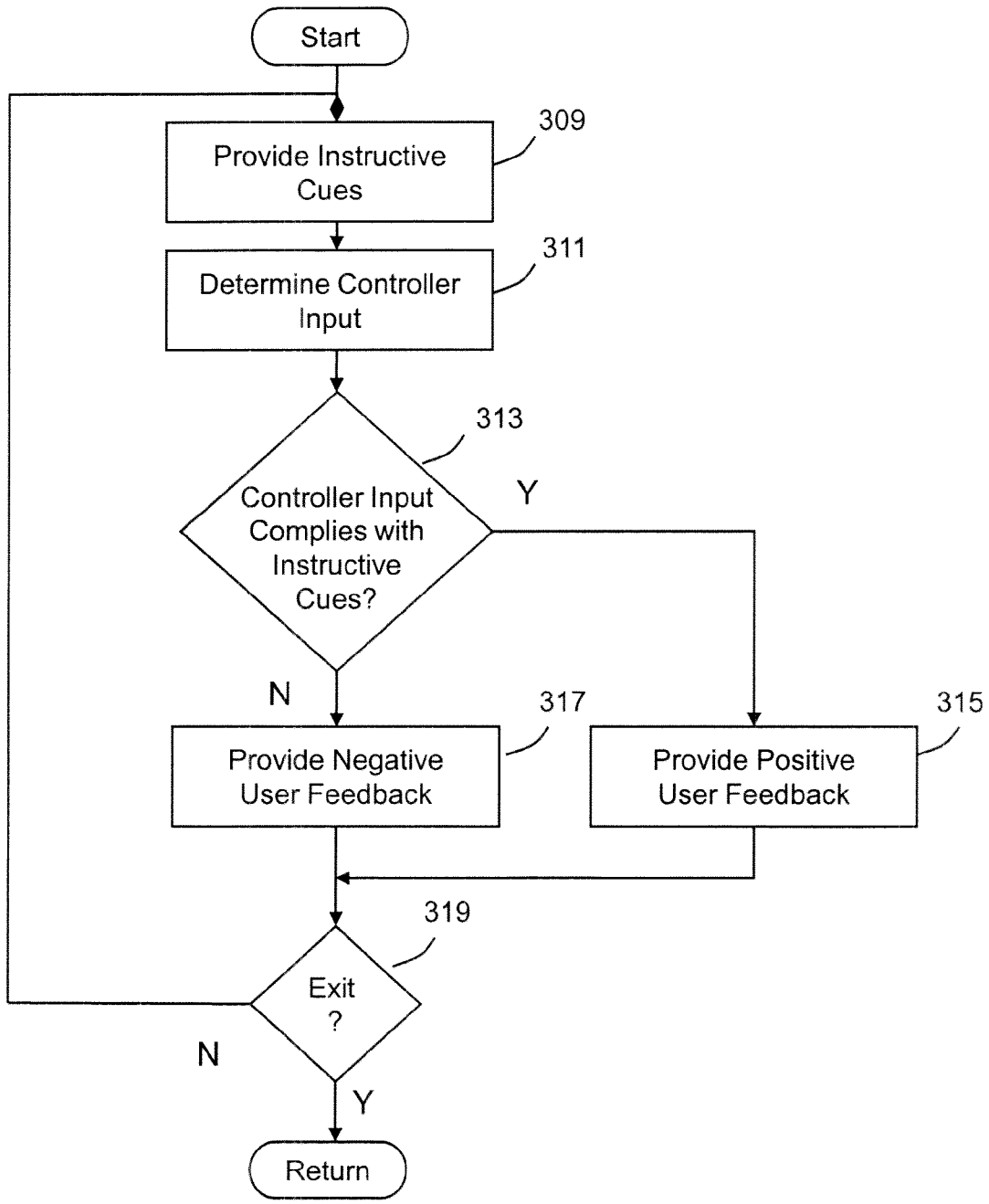
FIG. 3 is a flow diagram of a process of providing a music-based video game with a game player performance component in accordance with aspects of the invention.

The processor executes program instructions to provide music-based video game play, for example the music based video game described with respect to FIG. 1, as well as program instructions to provide for a user physical performance aspect to game play, for example as described with respect to FIG. 1 or 3. The processor may obtain program instructions from a removable memory source, for example, a video game DVD-ROM, inserted into the removable memory interface of the video game console. The processor also receives game player input signals from a video game controller, either through the user input/output port or the wireless transceiver. The processor processes the program instructions and received input signals to generate audio and video output signals representative of video game play.

The processor may also be in data communication with a display unit, generally combined with one or more speakers, which presents video game action to a game player of the system. The processor may send audio generation information to the audio driver, and video generation information to the video driver, each of which generates audio and video output signals, respectively, from the received generation information. The audio and video drivers forward the audio and video output signals through a combined display input/output port 225, or alternatively, separate audio and video input/output ports, to the display unit.

In some embodiments, the processor is also connected to the Internet via either the Internet input/output port, or via the wireless transceiver. In a multiplayer option, a connection to the Internet may be used to facilitate multiplayer game play with other game players in remote locations. In some embodiments, an Internet connection may also be used by video game publishers to offer, for free or for sale, downloadable content associated with a particular game. In a music-based video game, downloadable content may include, for example, new songs, background audio tracks or other content.

FIG. 3 is a flow chart of video game operations in accordance with aspects of the invention. The process may be performed by the video game console of FIG. 1, or a processor of the video game console, for example as discussed with respect to FIG. 2.

In block 309, the process commands display of instructive cues. In many embodiments, the instructive cues may comprise visual indicators instructing a player to enter an input or a plurality of inputs on a video game controller. The instructive cues generally scroll across portions of the screen towards and into a predefined area of the screen, such as the NOW area as discussed in FIG. 1. In some embodiments and for example in the embodiment illustrated in FIG. 1, a visual indicator of an audio stream is shown with a lateral shift. In some embodiments, this visual cue indicates that a cross fader input is to be used in the direction of the shift. For example and as illustrated in FIG. 1, the center audio stream is shown with a shift, to the right as illustrated, which indicates that the cross fader input is to be moved to the right. Additionally and also illustrated in FIG. 1, a visual indicator of a hidden gem is indicated on one of the audio streams. In some embodiments, this is an indication, for example, to depress a button on the rotatable platter corresponding to the audio stream as the hidden gem scrolls across the NOW area.

In simulated disc jockey game play using the disc jockey turntable deck video game controller, the buttons on the rotatable platter correspond to aspects of a heads up display (HUD) highway on the display. The HUD highway comprises a plurality of visual indicators which correspond to a plurality audio streams. The audio streams may include music track streams and audio sample streams. Depressing the buttons on the rotatable platter allows a player to perform actions related to the HUD highway and corresponding audio streams. In some embodiments, the rotatable platter can be rotated clockwise or counterclockwise while buttons on the rotatable platter are depressed to produce signals commanding the video game console to produce predetermined sound modifications or add additional sounds to the corresponding audio streams.

In block 311, the process determines controller inputs. In many embodiments, the controller includes a rotatable platter on a housing. Input devices extend through the surface of the platter, although in some embodiments the input devices are on the surface of the platter. In many embodiments, the controller includes a mixer, comprising a further housing, with further inputs, although in some embodiments no further housing is provided and the further inputs are provided with the housing material with respect to the rotatable platter. The mixer may include other sound effects inputs such as a dial and/or touch sensitive pad, which could have their own visual feedback elements. The video game controller produces input signals detectable by the video game console. Player operation of various video game controller inputs produces various input signals detectable by the game console. For example, rotation of the rotatable platter produces a signal detectable by the video game console indicating rotation of the platter with the signal generally indicating position of the platter, updated over time. In some embodiments, upon rotation of the platter, a mechanical sensor produces a signal detectable by the video game console indicating velocity In some embodiments, the velocity may be an angular velocity. Similarly, usage of the cross fader input and depressing the buttons on the rotatable platter produces further signals, distinct and detectable by the video game console. In some embodiments, alternate, directional or continuous rotation of the rotatable platter produces signal patterns detectable by the video game console indicating that the platter has been rotated in a particular pattern, force, length and speed. Similarly, usage of the cross fader input and depressing the buttons on the rotatable platter produces further signals, distinct and detectable by the video game console.

In block 313, the process determines if the controller input complies with the instructive cues. In many embodiments, the process evaluates game player compliance with the instructive cues, for example based on input signals provided by the controller operated by the game player. If the process determines that controller input complies with the instructive cues, the process proceeds to block 315 and provides positive user feedback. Otherwise, if the process determines that controller input does not comply with the instructive cues, process proceeds to block 317 and provides negative use feedback.

In block 315, the process provides positive user feedback. In many embodiments, positive feedback may be comprised of additional points, positive visual indicators, a positive simulated crowd response, such as cheering, and/or some other positive feedback to the game player. In addition, the video game console generally commands presentation of audio during video game play. In most embodiments audio of a musical selection is provided as the game player complies with the instructive cues and the musical selection is provided without any interruption or reduction in volume.

In block 317, the process provides negative user feedback. In many embodiments, negative user feedback may be comprised of muting, altering or reducing the volume audio tracks associated with the failed simulation action, no points being added to a player's score, negative visual indicators, a negative simulated crowd response, such as boos, and/or some other negative feedback to the game player. In some embodiments, negative user feedback may be comprised of a plurality of audio effects produced by modifying portions of the audio track. In some embodiments, portions of the audio track are modified by applying digital signal processing to portions of the audio track. In addition, the audio of a musical selection may result in a period of silence or a sound of a missed note, muting, altering or reducing the volume of the audio tracks associated with a failure to comply with an instructive cue possibly depending on whether the game player operates incorrect input devices or does not operate any input devices.

The process thereafter proceeds to block 319 and determines whether the process should exit, although it should be recognized that exit processing may occur through other methods, such as provision of an interrupt signal or otherwise. If the process is not to exit, the process goes to block 309, otherwise the process returns.

Figure 4:
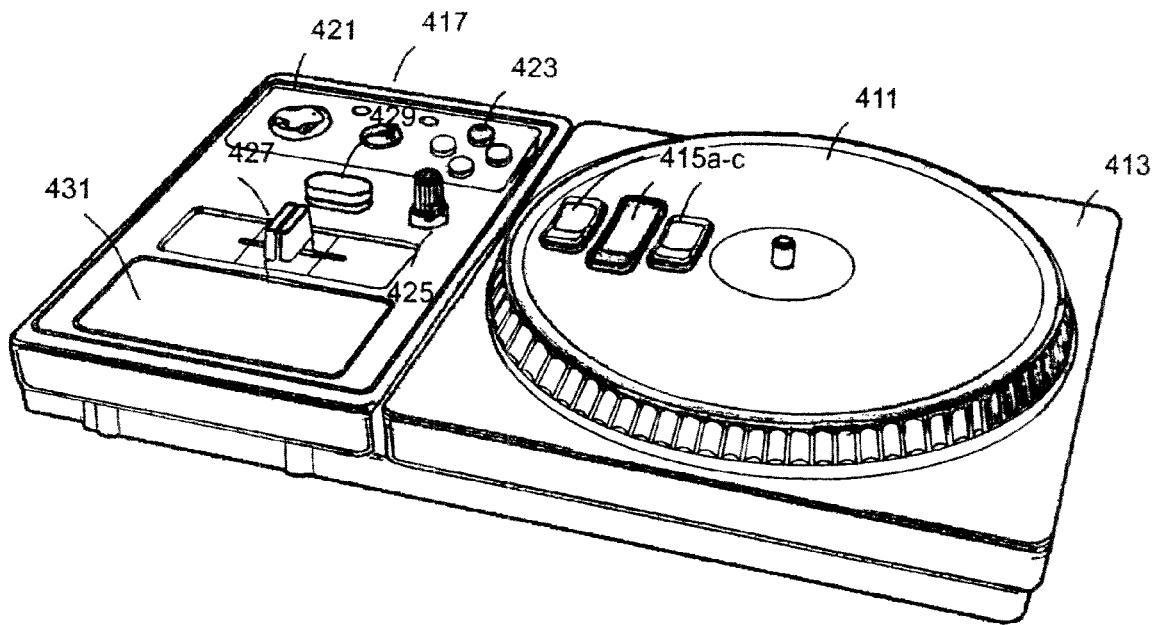
FIG. 4 is an embodiment of a disc jockey deck shaped video game controller with input buttons on the rotatable platter in accordance with aspects of the invention.

FIG. 4 is an embodiment of a video game controller in accordance with aspects of the invention. The video game controller can be considered to simulate a disc jockey turntable deck. The video game controller comprises a rotatable platter 411 on a housing 413. Input devices 415a-c extend through the surface of the platter, although in some embodiments the input devices are protruding or subsurface/recessed on the surface of the platter. For example, and as illustrated in FIG. 4, the input devices comprise three buttons on the surface of the rotatable platter. In many embodiments, and as shown in FIG. 4, the video game controller includes an additional housing 417. As illustrated in FIG. 4, the additional housing includes mixer and effects inputs on or extending through the surface of the additional housing, although in some embodiments no further housing is provided and the mixer inputs are provided with the housing material with respect to the rotatable platter. In one embodiment, and as illustrated in FIG. 4, the input devices on or extending through the surface of the mixer housing comprise a pad 421, a plurality of deck buttons 423, a rotatable knob 425, a cross fader or potentiometer, or slidable switch 427, a button 429, and a touch pad 431 or hand proximity or gesture sensor. In many embodiments the pad 421 and plurality of deck buttons 423 may be used to navigate a music-based video game menu system. In some embodiments, the pad and plurality of deck buttons may be further used during music-based video game play.

In some embodiments, the video game controller is the video game controller illustrated in the video game system of FIG. 1, and may be used in accordance with a music based video game featuring playing of a simulated instrument, for example, a disc jockey turntable deck with multiple music source changes and scratching. In these embodiments, the video game controller of FIG. 4 may be operated by a user to generate input signals which are transmitted to a video game console. The video game console processes the input signals and generates audio and video outputs based on the operation of the video game controller. The audio and video outputs may be directed towards playing of the simulated disc jockey deck.

In many embodiments, a video game console include a rotatable knob 425, where position changes of the knob may cause variation of the audio outputs and/or modifications to the visual indicators representing the audio streams. For example, the video game console may increase the output frequency of an audio stream upon determining that the rotatable knob is rotating clockwise. In many embodiments, a portion of the audio output is modified by applying digital signal processing to the portion of an audio track. In some embodiments, the rotatable knob 425 may be used at predetermined portions of the audio streams, although in other embodiments the rotatable knob may be used at any portion of the audio streams. In some embodiments, the rotatable knob may be considered as representative of an effects dial.

In many embodiments, the slidable switch or cross fader potentiometer 427 comprises a knob or button which slides along a track on a single axis. However, in some embodiments, the cross fader may comprise a touch sensitive strip. The slidable switch 427 may be considered as a cross fader input. In some embodiments, the cross fader may provide a blending capability and may sense gradual movement of the knob or button of varying degrees along the track. In many embodiments, the knob or button is at a neutral position when it is positioned at the center of the track. In some embodiments, the fader knob, or button automatically returns to the neutral position when released. The knob or button may be moved left or right along the track relative to the neutral position or the fader may determine that it was moved left or right from a more "general" center position. The fader may contain a center tactile "pocket" felt when sliding it.

In some embodiments, the songs that are played by the user are created and recorded by a professional DJ who mixed two or more songs together and added DJ scratching, sound effects and generated samples. In some embodiments, the music source is a prerecorded mix of standard songs separated into independent stems corresponding to each of the main control systems on the simulated DJ controller.

The cross fader may be used in conjunction with the platter buttons to simulate switching between a plurality of audio streams such as two DJ turntables which is typically 2 music streams. In many embodiments, the video game controller simulates a two platter system using only a single platter. For example, in a two platter system, each rotatable platter corresponds to an audio stream and a user may switch between audio streams by operating the appropriate platter; however in this embodiment, each button on the platter corresponds to an audio stream and therefore a user may switch between audio streams by depressing the appropriate buttons on the single platter. In some embodiments, and as discussed in FIG. 3, the music-based video game may provide instructive cues commanding a video game player to use the cross fader, although in other embodiments, a player may use the cross fader at any point during video game play. Compliance with the instructive cues may result in positive user feedback, while non-compliance with the instructive cues may result in negative user feedback. In some embodiments, for example in the embodiment illustrated in FIG. 1, the cross fader may be used to switch between a first music stream and second music stream. In one embodiment, a third audio stream comprised of audio samples, may always be active and unaffected by cross fader usage. When the knob or button is in a neutral position, all three audio streams are active and the audio output of all three audio streams may be heard. When the knob or button is in the furthest left position, only the first audio stream and the audio sample track may be heard. In many embodiments, the first audio stream corresponds to first music stream represented by a visual indicator generally positioned on the left on the HUD highway and represents usage of a left turntable. When the knob or button is in the furthest right position, only the second audio stream and the audio sample track may be heard. In many embodiments, the second audio stream corresponds to second music stream represented by a visual indicator generally positioned on the right of the HUD highway.

In many embodiments, a button 429 may be considered as an attack button. In some embodiments, the button 429 may be of a transparent material and may be illuminated during portions of music-based game play. The attack button may be used to trigger a plurality of effects during music-based video game play.

In many embodiments, the attack button may become available to be used after the game has reached a predetermined state; for example, once a player has completed portions of an audio stream without errors or has reached a predetermined score. In some embodiments, the attack button may become available to be used during predetermined portions of the audio streams or during portions determined during game play based on game criteria, although in other embodiments the attack button may be used at any portion of the audio streams. Additionally, the music-based video game may provide instructive cues to alert the player that the game is in a state where the attack button may be used. For example, in some embodiments, the attack button may be illuminated when it is valid for a player to use it. In some embodiments, the game display may provide a prompt or signal during music-based video game play, for example an indicator on the game display, or other visual, auditory, or other prompt.

In many embodiments, during single player music-based video game play, the attack button may trigger a game state which allows a player to possibly score further points. In some embodiments, the attack button may trigger a game state which increases the playing difficulty of a competing player in numerous ways. For example, in some embodiments, triggering the attack button may increase or decrease the overall speed of an audio track, making it more difficult for a player to comply with instructive cues at the proper moment. In some embodiments, using the attack button during single player game play activate a multiplier factor which increases player score. In many embodiments, during multiplayer game play, the attack button may be used to modify another player's performance.

In many embodiments, the touch pad 431 may be considered as an effects pad. The effects pad may be used to produce sound modifications to the audio outputs and/or modifications to the visual indicators representing the audio streams. For example, moving a finger from left to right along the touch sensitive pad may increase the output frequency of an audio stream, while moving a finger from top to bottom along the touch sensitive pad may decrease output volume of an audio stream. In some embodiments, a visual indicator may be provided in the form of a line which displays patterns that may be replicated utilizing user input on the touch pad. In some embodiments, the touch pad may additionally contain a light source or further visual indicators that react to user inputs. In some embodiments, the effects pad may be used at predetermined portions of the audio streams, although in other embodiments the effects pad may be used at any portion of the audio streams and may provide sound effects that may be activated by the user.

Figure 5:
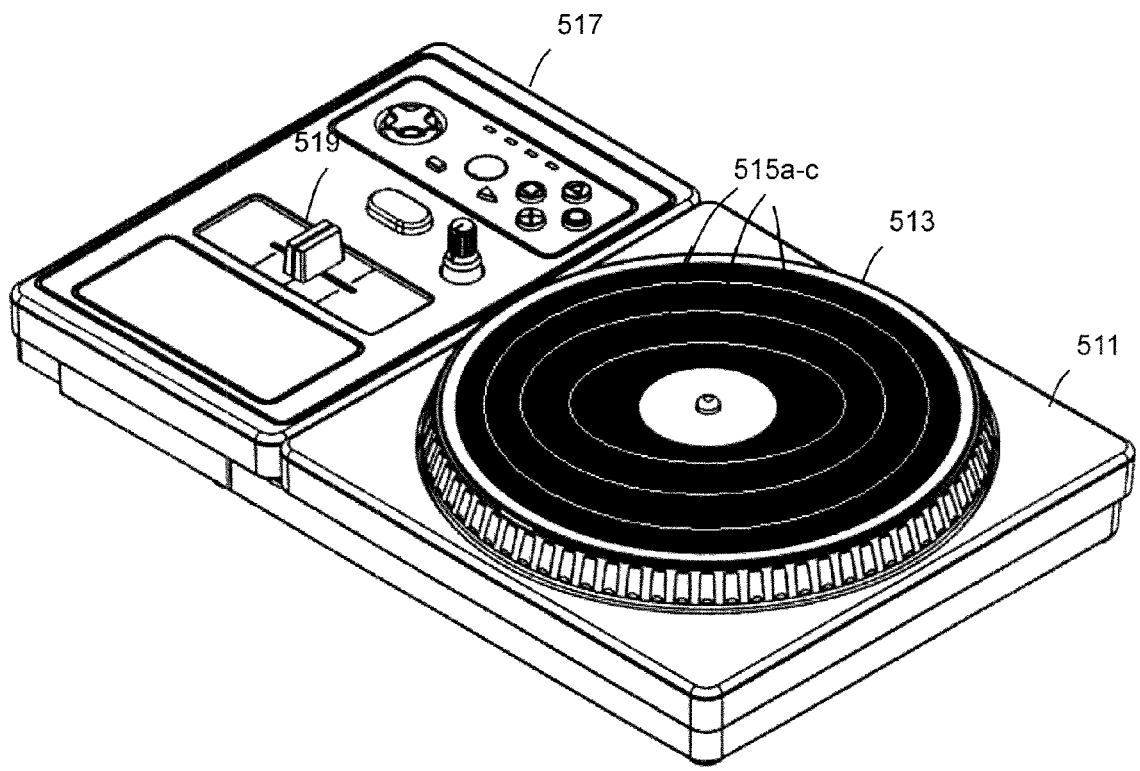
FIG. 5 is an embodiment of a disc jockey deck shaped video game controller with touch sensitive inputs on the rotatable platter in accordance with aspects of the invention.

FIG. 5 shows a further embodiment of a video game controller in accordance with aspects of the invention. The video game controller of FIG. 5 includes a first housing 511, with a rotatable platter 513 on top of and mounted to the first housing. In some embodiments, the platter may be rotatable a continuous 360 degrees, although in some embodiments, the platter may only be rotatable a predetermined number of degrees. In some embodiments, the platter may be freely rotatable, although in some embodiments, the platter may automatically return to a neutral or default position after it is rotated and released. As illustrated in FIG. 5, the rotatable platter is mounted on a mesa of the top of the first housing, with the mesa in substantially cylindrical form. The rotatable platter and the first housing therefore have an appearance similar to a vinyl record on a record turntable. The rotatable platter is coupled to the first housing by way of a shaft or other rotary connector. In general, electromechanical or optoelectrical components within the first housing measure relative position of the shaft, allowing for determination of relative rotational position of the rotatable platter. In some embodiments, the rotatable platter may be covered with decorative record covers and similarly, the housing may be covered with decorative housing covers.

The rotatable platter includes a plurality of touch sensitive regions 51a-c. As shown in FIG. 5, three touch sensitive regions are provided, and the touch sensitive regions are arranged in concentric rings about the axis of the rotatable platter. The touch sensitive regions, which may for example comprise capacitive touch sensing elements or strips, provide user input devices on the rotatable platter. These user input devices are electrically coupled to circuitry within the first housing. Preferably these user input devices are electrically coupled to the circuitry within the first housing by a slip ring connector or other rotary electromechanical connector, preferably allowing unconstrained rotation of the rotatable platter about its axis. In some embodiments, the touch sensitive regions may comprise grooves or may be providing from the rotatable platter to provide improved tactile feedback to the game player.

In many embodiments, the circuitry within the first housing determines whether a touch sensitive region has been validly pressed. For example, in some embodiments, it may be useful to determine a time of occurrence of application of pressure to the touch sensitive region, as opposed to, for example maintenance of a finger of palm on the region. In one embodiment, the circuitry samples the state of each touch sensitive region a plurality of times, for example 256 times, and determines a super sample by taking the average of the 256 samples. The circuitry determines a first moving average using the super samples and a second moving average using the super samples. The first moving average and second moving average may be, for example, moving averages over a predetermined time window, with the first moving average a fast moving average and the second moving average a slow moving average. The moving averages in various embodiments may be weighted averages or exponentially weighted averages. A positive difference between the first moving average and the second moving average which is greater than a set threshold, indicates a button press.

A second housing 517 is coupled to the first housing, although in some embodiments the first housing and the second housing are combined in a single housing. In the embodiment of FIG. 5 the second housing is coupled to a side of the first housing. A plurality of user input devices are provided on a top of the second housing. As illustrated in FIG. 5 the user input devices include a cross fader switch 519, which may for example be used to provide a mixing related function in a video game, and accordingly the second housing and it user input devices may be considered a mixer module. In addition to the cross fader switch, the user input devices of the mixer module include a rotary switch, a plurality of buttons, and a touch sensitive pad.

Figure 6:
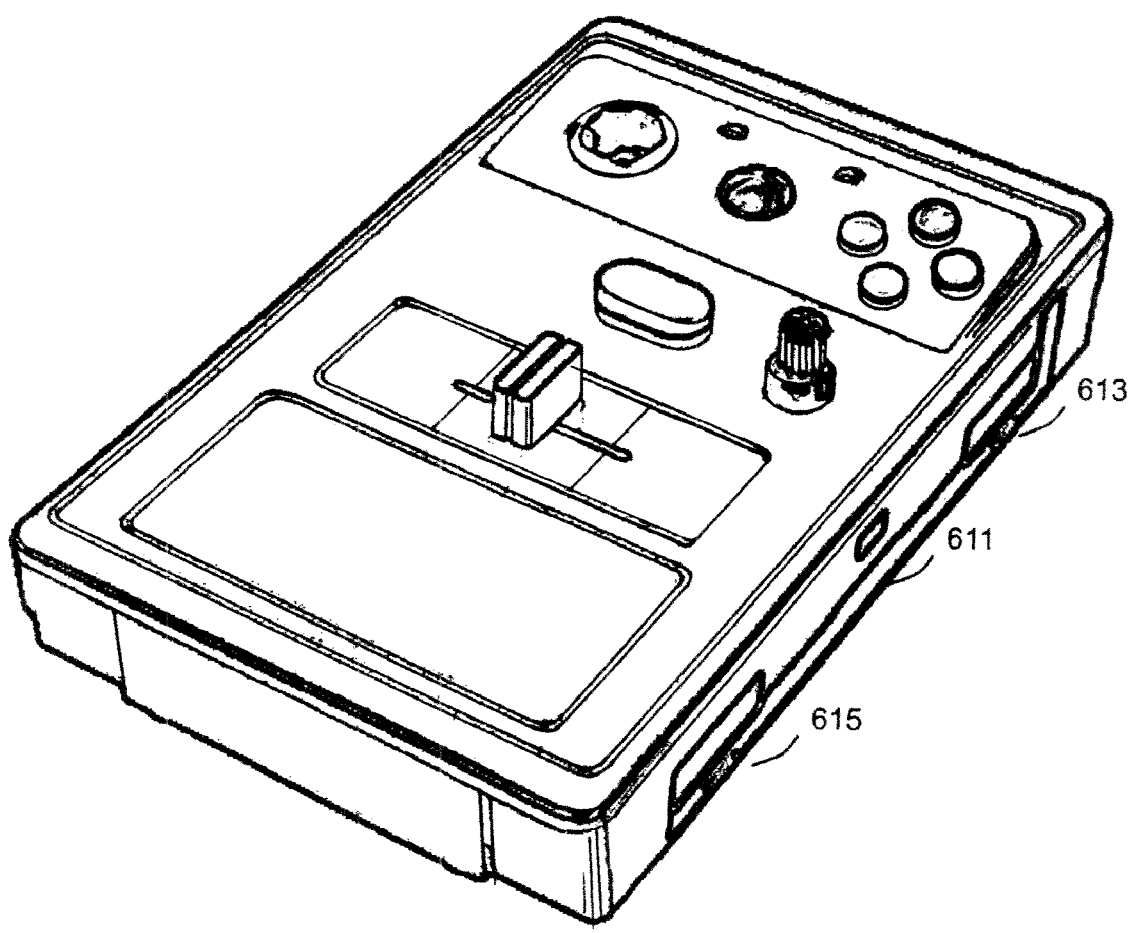
FIG. 6 is an embodiment of a disc jockey mixer shaped video game controller with a plurality of input devices in accordance with aspects of the invention.

FIG. 6 is a perspective view of the mixer module of FIG. 5, showing a side 611 of the mixer module intended to be mated with a side of a housing with a rotatable platter. The side of the mixer module includes a first connector 613 and a second connector 615. The first connector and the second connector provide for electrical coupling of the mixer module with other units, for example a housing with a rotatable platter. The first connector and the second connector are configured for mating to corresponding connectors of a housing having a rotatable platter coupled thereto. In the embodiment of FIG. 6 the first connector and the second connector are female connectors, although male connectors may instead be used, or one male connector and one female connector.

An opposing side of the mixer module additionally includes similar connectors similarly positioned. The additional connectors allow for mating of the opposing side of the mixer module to a side of a housing with a rotatable platter, for example either a second housing with a rotatable platter or a housing with a rotatable platter, with relative position of input devices on the mixer module reversed with respect to a housing with a rotatable platter. Allowing for reversal of relative position of the input devices on the mixer module with respect to a housing with a rotatable platter may be convenient for positioning of input devices with respect to either hand of a game player, for example allowing for a "lefty flip" of a game controller comprising both a mixer module and a housing with a rotatable platter.

FIG. 7 shows an example of an embodiment of a video game controller where a mixer module and a turntable module are physically separable in accordance with aspects of the invention. As illustrated in FIG. 7a, the mixer module and turntable module are shown as separate modules. A side of the turntable module is shown with a plurality of connectors. The connectors provide for electrical coupling of the turntable module with a mixer module, which also has a plurality of connectors. In FIG. 7b, the mixer module and turntable module are shown in the process of being coupled into a single video game controller unit. In FIG. 7c, the mixer module and turntable module are shown coupled together as a single video game controller unit.

Figure 8:
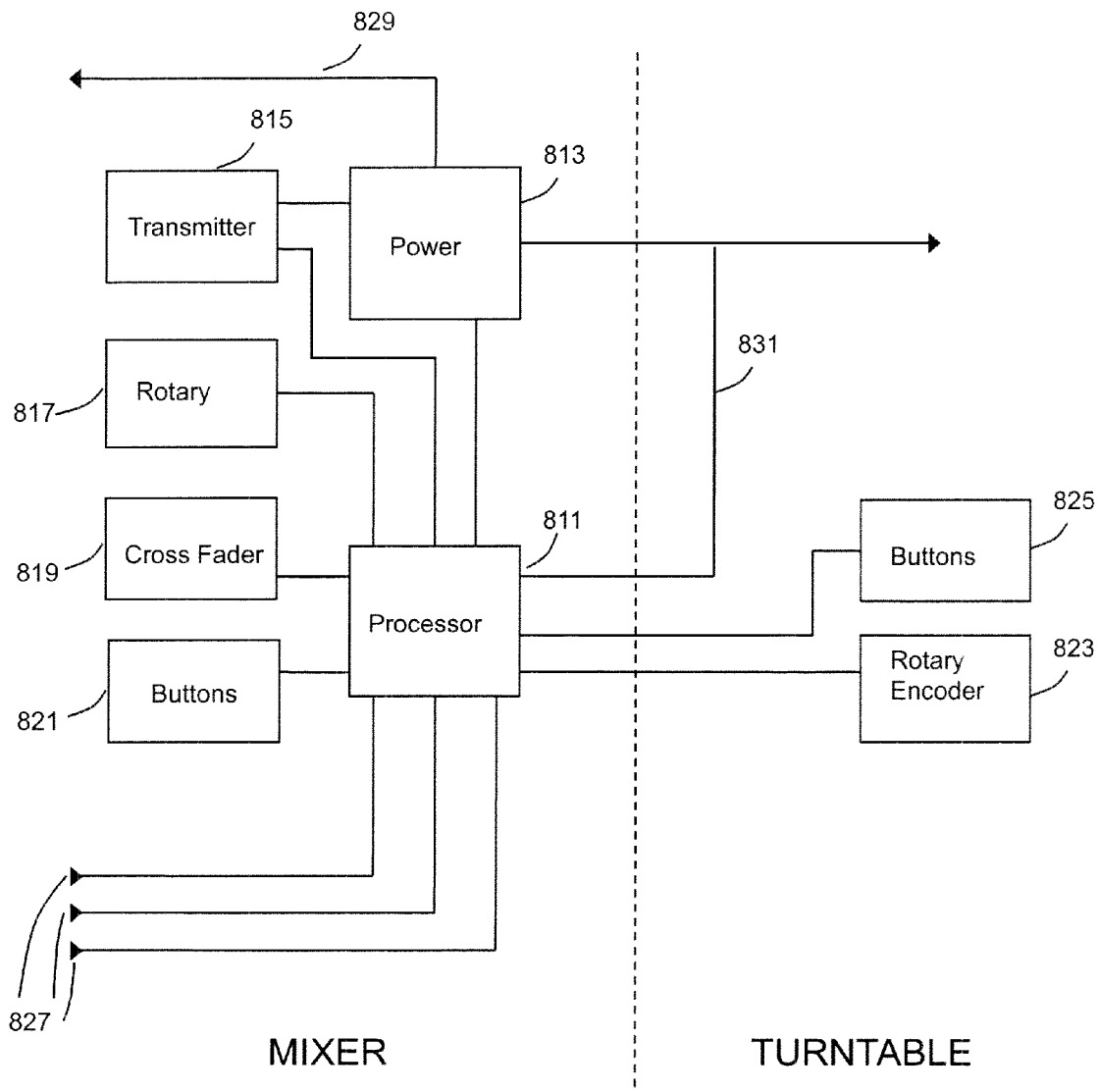
FIG. 8 is a block diagram of an example controller in accordance with aspects of the invention.

FIG. 8 is an example of a block diagram of a video game controller in accordance with aspects of the invention. In the embodiment of FIG. 8, the video game controller includes a mixer portion and a turntable portion. The mixer portion of the video game controller includes at least one processor 811 interconnected with other components. The electrical connections may be, for example by way of a system bus or direction connections. The other components may include, for example, a source of power 813, a transmitter 815, a rotary input 817, a cross fader input 819, and for example button inputs implemented using a linear switch 821. Additionally, the turntable component of the video game controller includes a rotary encoder 823 and further button inputs 825. The rotary encoder 823, for example, determines relative rotational position of a shaft, with the shaft coupled to a rotatable platter representative of a turntable. Signals indicative of the state of the other components are provided to the processor. The processor 811 provides input state information to the transmitter 815, which in many embodiments is a wireless transmitter. The transmitter 815 is configured to transmit information, for example input state information, to a video game console or apparatus. As illustrated, the source of power 813 is present in the mixer portion, with power being provided to the turntable portion, for example a battery and additional power regulator circuitry, from the mixer portion. Alternatively, in some embodiments, a turntable portion may also include a source of power, a connector and flexible boom stand for a microphone for recording vocal samples or singing, a plug for headphones listening to and previewing and selecting samples, music sources or tracks for live mixing.

An optional beats per minute (BPM) or tempo dial, which can speed up or slow down any portion of or an entire song to make the song easier or more difficult to play or may be used as an effect.

In other embodiments of the invention, there may be different combinations of components that make up a video game controller, depending on the individual needs of each application. For example, a second turntable with a further rotary encoder and buttons may be coupled to the mixer. In the embodiment of FIG. 8, further inputs 827 to the processor and an additional power supply 829 output are shown and may be used to couple a second turntable to the mixer and would require additional visual indicators to instruct the user which of the two turntable inputs are to be utilized.

The processor receives game player input signals from the video game controller inputs. Input signals are transmitted by the transmitter 815 to a video game console. The video game console processes the input signals received from the video game controller to generate audio and video output signals representative of a game player's inputs into the video game controller. In addition, in many embodiments, the mixer portion and the turntable portion are physically separable. In the embodiment shown, a power signal 831 is routed from the mixer portion, to the turntable portion, and back to the mixer portion. The return of the power signal 831 allows the mixer portion to determine presence of a turntable portion. Similarly, and in the embodiment shown, the mixer portion has a further power signal 829, and further inputs to the processor 827 which allows a second turntable portion to be coupled to the mixer portion. The return of the power signal 829 from a second turntable allows the mixer portion to determine the presence of a second turntable portion.

Figure 9:
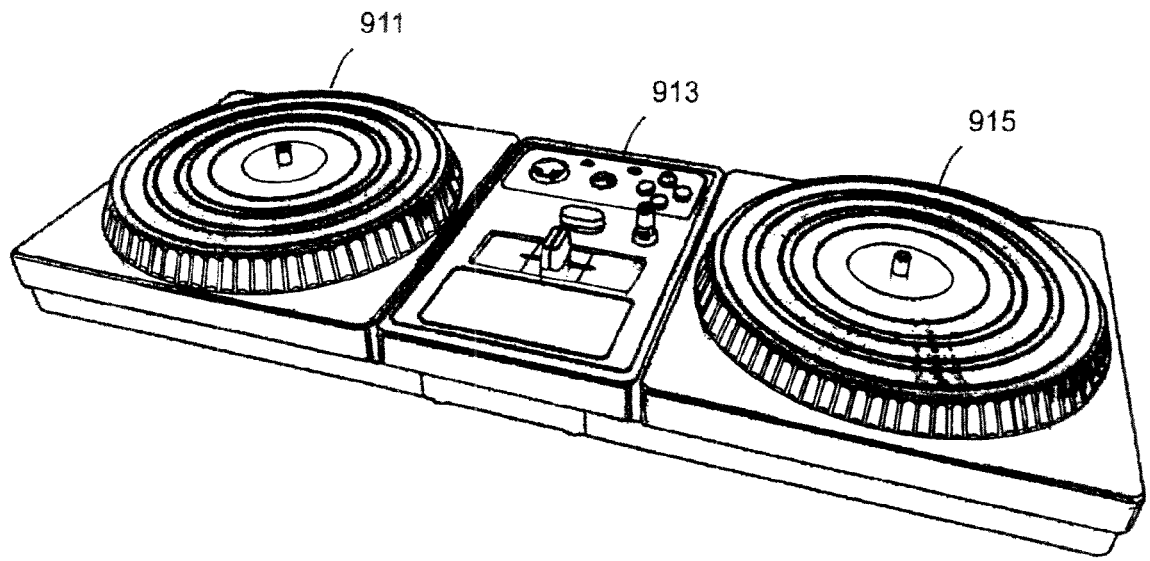
FIG. 9 is an embodiment of a disc jockey deck shaped video game controller with two rotatable platters in accordance with aspects of the invention.

FIG. 9 shows an example of an embodiment of a video game controller where a mixer module 913 is coupled to two turntable modules. As illustrated in FIG. 9, the mixer module and turntable modules are shown coupled together as a single video game controller unit, with a turntable module 911 coupled to the left of the mixer module and a turntable module 915 coupled to the right of the mixer module. In some embodiments and as discussed in FIG. 7, the mixer module and turntable modules may be separable.

Figure 10:
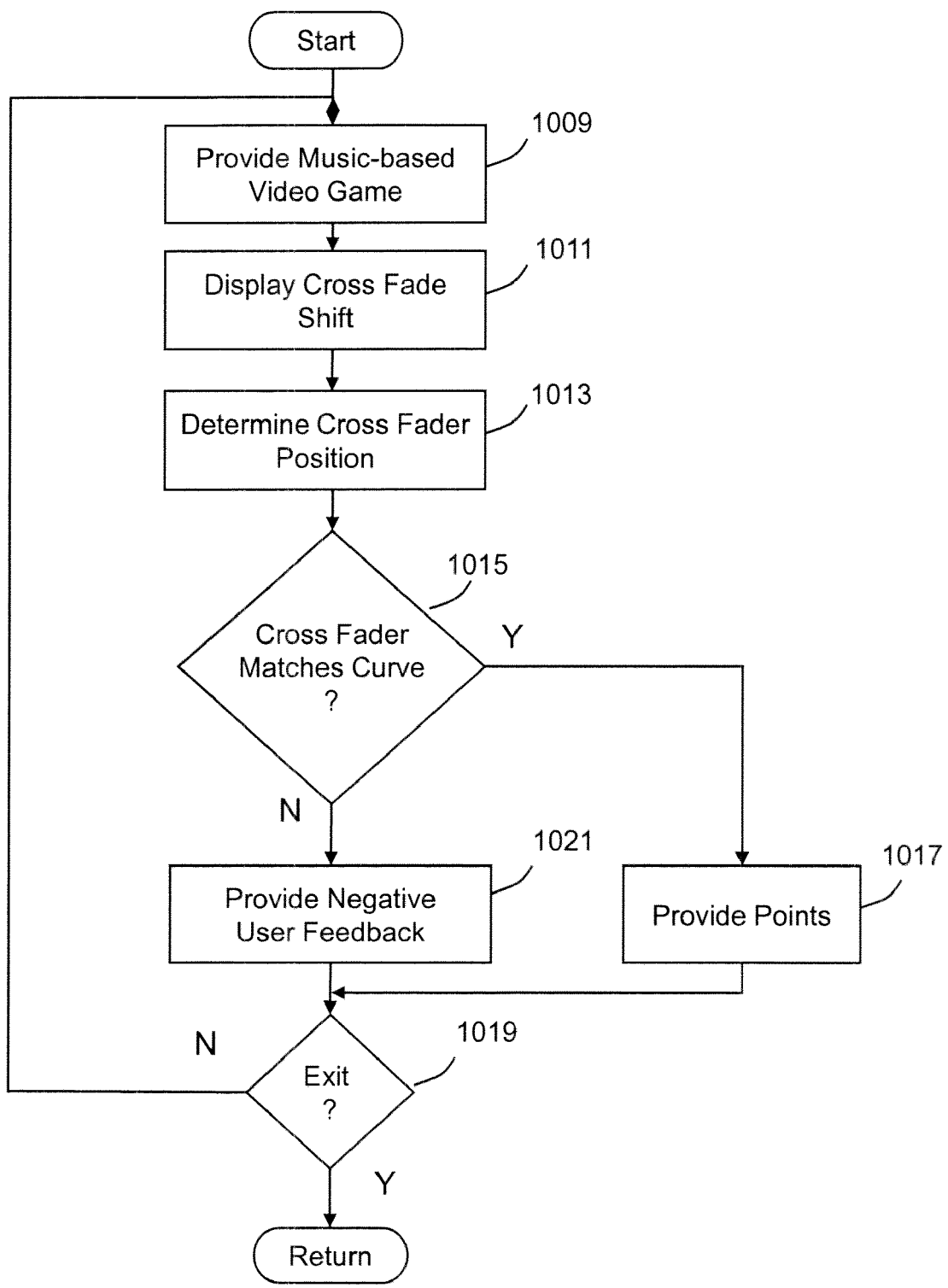
FIG. 10 is a flow chart of a process of video game cross fader operations in accordance with aspects of the invention.

FIG. 10 is a flow chart of video game operations in accordance with aspects of the invention. The process may be performed by the video game console of FIG. 1, or a processor of the video game console, for example as discussed with respect to FIG. 2.

In block 1009 the process provides for music-based video game play. In many embodiments the process commands display of instructive cues and evaluates game player compliance with the instructive cues, for example based on input signals provided by a controller operated by the game player. In many embodiments the process also commands presentation of audio of a song or portions of a song, with extent of presentation of the song dependent on extent of compliance by the game player with the instructive cues. The process may also provide features of music-based video game play commonly found in music-based video games. In most embodiments the process provides for music-based video game play throughout or substantially throughout operation of the process.

Blocks 1011-1017 relate to cross fader usage during music-based video game play. In many embodiments, the cross fader comprises a touch strip, knob or button which slides along a track on a single axis. In many embodiments, the knob or button is at a neutral position when it is positioned at the center of the track. In some embodiments, the knob or button automatically returns to the neutral position when released. The knob or button may be moved left or right along the track relative to the neutral position.

In block 1011, a visual indicator on a display representing an audio stream is laterally shifted, indicating that the cross fader is to be used. In many embodiments, the direction of the shift may indicate the direction that the cross fader is to be moved. For example, a visual indicator representing an audio stream may be shifted toward the left of the display, indicating that the cross fader knob or button is to be moved to the left along the track. Alternatively, a visual indicator representing an audio stream may be shifted to the right of the display, indicating that the cross fader knob or button is to be moved to the right along the track. In the preferred system, from a center position, the left line may only move/fade to the left and the right line may only move/fade to the right simulating left and right turntables.

In block 1013, the process determines cross fader position. In many embodiments, a position of the knob or button along the track produces a signal from which the process may determine cross fader position. In some embodiments, movement of the knob or button along the track from a reference point produces a signal from which the process may further determine cross fader position.

In block 1015, the process determines if cross fader position matches a predetermined position as indicated by the shifted visual indicator representing the audio stream. In some embodiments, the process determines if cross fader position movement matches a predetermined movement pattern as indicated by the shifted visual indicator representing the audio stream. In some embodiments, the process determines if cross fader position and an associated button press, button press duration or pattern and scratch platter rotating pattern matches a predetermined position as indicated by the shifted visual indicator representing the audio stream. If the cross fader position matches the predetermined position, the process proceeds to block 1017. Otherwise, if the cross fader position does not match the predetermined position, the process proceeds to block 1021. After performing the operations of block 1017, the process proceeds to block 1019.

In block 1017, the process provides points. In some embodiments, the amount of points provided is correlated to how closely the cross fader matches a predetermined position as indicated by the shifted visual indicators representing the audio streams. In some embodiments, the amount of points provided is not affected by to how closely the cross fader matches the predetermined position.

In block 1021, the process provides negative user feedback. In many embodiments, non-compliance with an instructed cross fade may result in negative user feedback such as silence or a muted audio track for a period of time. In some embodiments, the negative user feedback may be comprised of no points being added to a player's score, negative visual indicators, a negative simulated crowd response, such as boos, and/or some other negative feedback to the game player.

The process thereafter proceeds to block 1019 and determines whether the process should exit, although it should be recognized that exit processing may occur through other methods, such as provision of an interrupt signal or otherwise. If the process is not to exit, the process goes to block 1009, otherwise the process returns.

Figure 11:
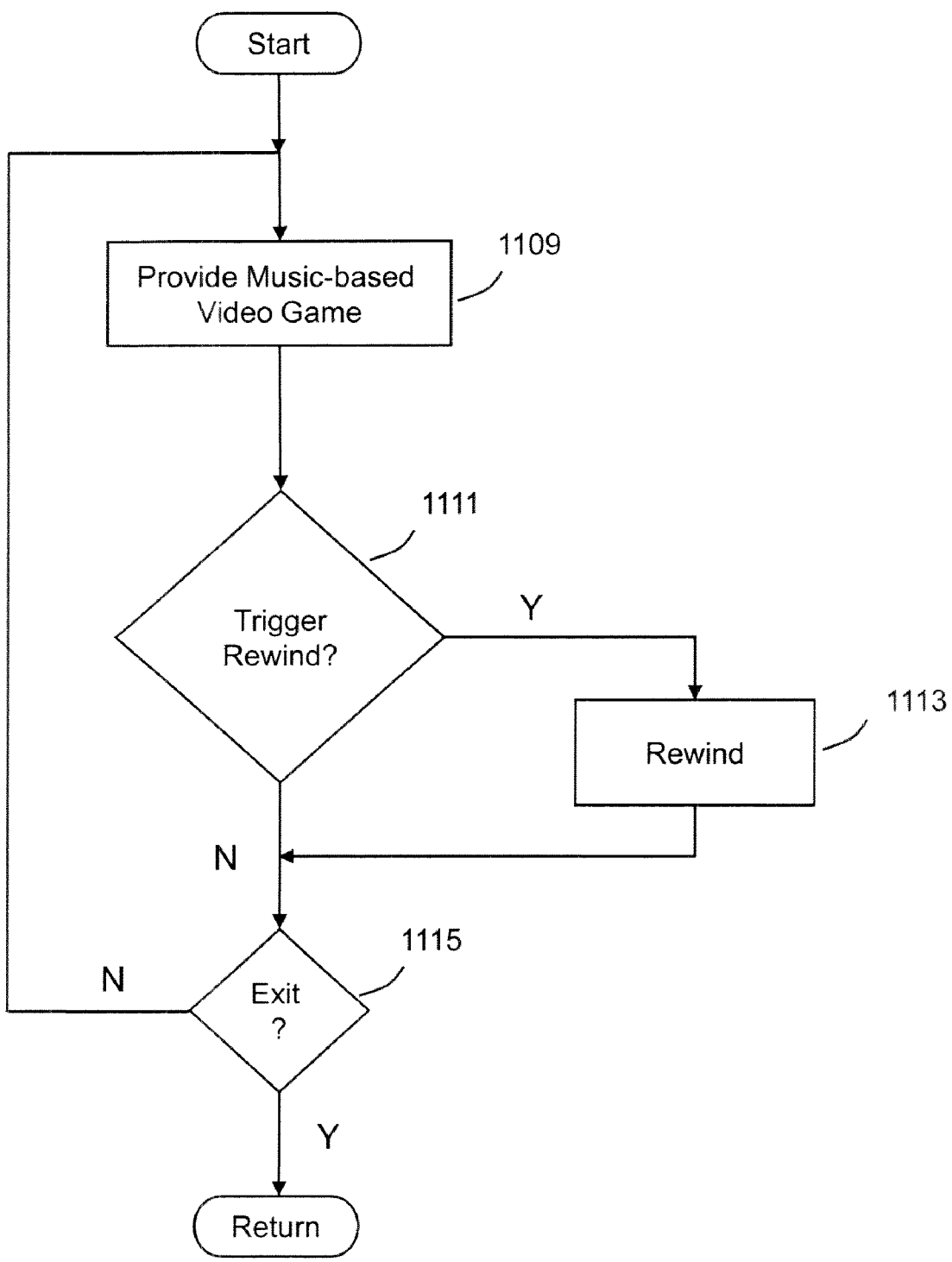
FIG. 11 is a flow chart of a process of video game rewind operations in accordance with aspects of the invention.

FIG. 11 is a flow chart of video game operations in accordance with aspects of the invention. The process may be performed by the video game console of FIG. 1, or a processor of the video game console, for example as discussed with respect to FIG. 2.

In block 1109 the process provides for music-based video game play. In many embodiments the process commands display of instructive cues and evaluates game player compliance with the instructive cues, for example based on input signals provided by a controller operated by the game player.

In many embodiments the process also commands presentation of audio of a song or portions of a song, with extent of presentation of the song dependent on extent of compliance by the game player with the instructive cues. The process may also provide features of music-based video game play commonly found in music-based video games. In most embodiments the process provides for music-based video game play throughout or substantially throughout operation of the process.

In block 1111, the process determines if rewind has been triggered during music-based video game play. In many embodiments, rewind may be triggered by player input on a game controller; for example counter-clockwise rotation of a rotatable platter of the controller, although in some embodiments rewind may be triggered by clockwise rotation of the rotatable platter. In some embodiments, rewind may be triggered after the game has reached a predetermined state. For example, rewind may be triggered after a player has reached a predetermined score or met other performance criteria. In some embodiments, rewind may be available to be triggered during predetermined portions of the audio streams or during portions determined during game play based on game criteria, although in other embodiments rewind may be triggered at any portion of the audio streams. Additionally, the music-based video game may provide instructive cues to alert the player that the game is in a state where rewind may be triggered. For example, the game display may provide a prompt or signal during music-based video game play, for example an indicator on the game display, or other visual, auditory, or other prompt. In some embodiments, rewind mode may be triggered by a combination of player input on the game controller and game state. For example, rewind may be triggered by a counter-clockwise or clockwise rotation of a rotatable platter of the controller after the player has reached a predetermined score. If the process determines that rewind has been triggered, the process proceeds to block 313 and initiates rewind. Otherwise, or after performing the operations of block 1113, the process proceeds to block 1115.

In block 1113, the process returns audio streams and visual indicators representing the audio streams to an earlier point in the audio streams. This allows a player to replay a portion of the audio streams and possibly score additional points. In some embodiments, an audio effect or an auditory cue is produced, signaling that rewind has been triggered. In many embodiments, an audio stream is divided into a plurality of predetermined portions. In some embodiments, if rewind is triggered during predetermined portions of the audio streams or during portions determined during game play based on game criteria, the audio streams are returned a further earlier point in the audio streams, allowing a player to replay an even greater portion of the audio stream and possibly score further points. In some embodiments, the number of portions that may be replayed during rewind may depend upon a plurality of factors, including timing of triggering rewind, a player score, or other criteria. In some embodiments, a player score may additionally be modified by a multiplier during replayed portions which further increases the score. In some embodiments the multiplier value is based on extent of compliance with operations commanded by the instructive cues during rewind. For example poor compliance may result in no multiplier modification and perfect compliance may result in a multiplier modification of doubling a player's score. In some embodiments, the multiplier value may decrease as compliance with the operations commanded by the instructive cues decreases or alternatively increase as compliance with the operations commanded by the instructive cues increases. The process thereafter proceeds to block 1115 and determines whether the process should exit, although it should be recognized that exit processing may occur through other methods, such as provision of an interrupt signal or otherwise. If the process is not to exit, the process goes to block 1109, otherwise the process returns.

Figure 12:
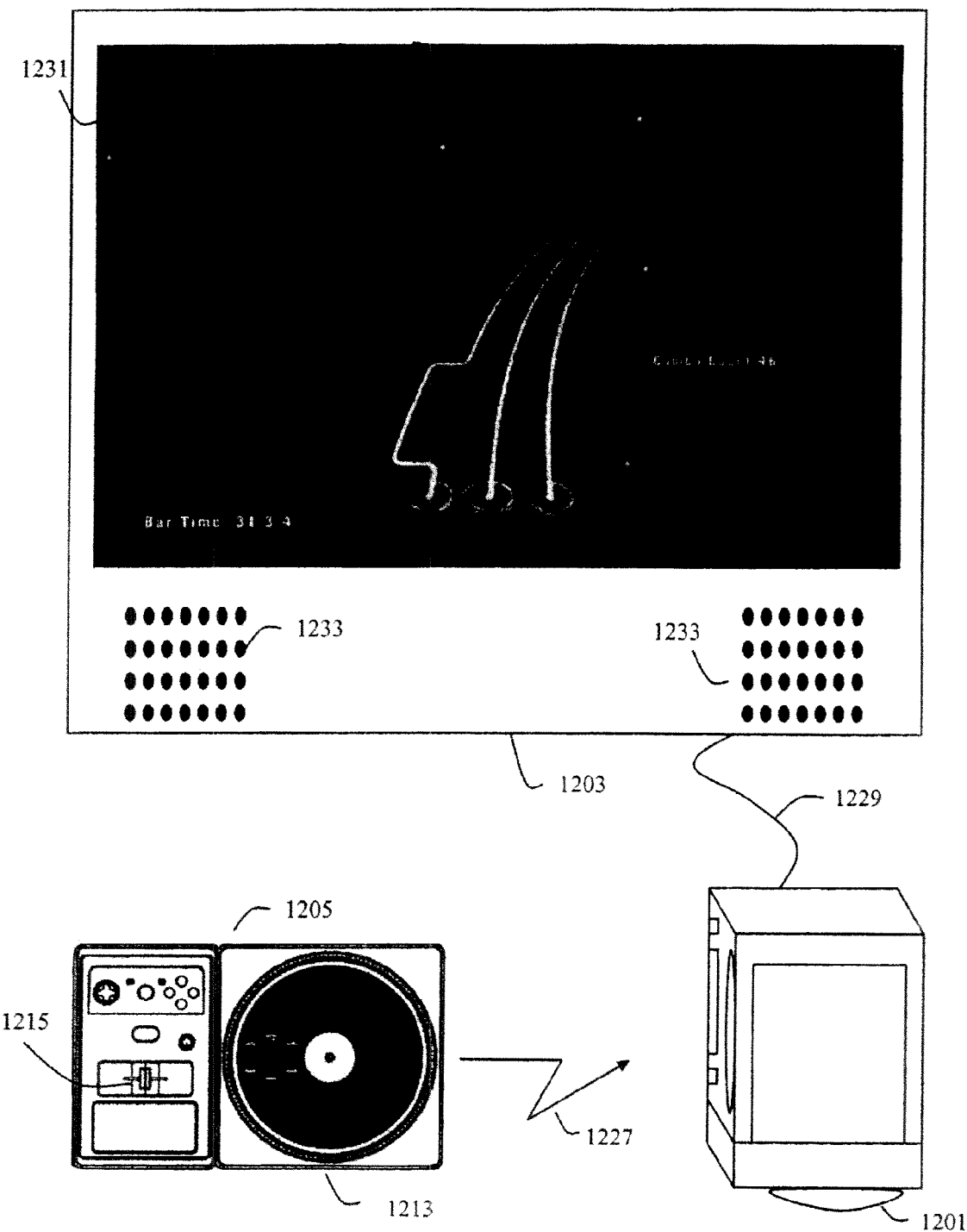
FIG. 12 illustrates a further example of a video game system in accordance with aspects of the invention.

FIG. 12 is an example of a video game system in accordance with aspects of the invention. The video game system includes a video game console 1201, a display 1203, and a controller 1205. The video game console includes internal circuitry which allows the console to run a video game by executing various program instructions related to proper execution of the video game. The video game console is coupled to the controller by a wireless connection 1227, although it should be recognized that in many embodiments the controller and video game console may be coupled by a wired connection. The controller includes a rotatable platter on a housing 1213 and a cross fader switch 1215. The video game console is also in communication with a display unit 1203, generally through an audio-video cable or similar wired connection, although a wireless connection may be used in some embodiments. The display unit is typically a television, although in some embodiments a monitor may be used, with a display screen and at least one audio output device, such as a speaker 1233.

As illustrated in FIG. 12, the display shows a screenshot 1231 of an example music-based video game. In the particular screenshot of FIG. 12, the display shows a heads up display (HUD) highway, comprising three lines, corresponding to a left music stream, a center audio sample stream, and a right music stream. As discussed in FIG. 3, the lines corresponding to the music streams may be shown with a lateral shift. The lateral shift indicates that a cross fader input is to be moved or positioned in the direction of the shift. For example, in FIG. 12, the line for the left music stream shows a lateral shift to the left is approaching a NOW area, indicating the cross fader switch should be moved to the left. An indicator of current cross fader position is shown approximately in a NOW area. The indicator of current cross fader position is graphically illustrated in FIG. 12 as buttons in lateral slots. In the embodiment of FIG. 12, presence of the buttons in portions of the lateral slots towards a center stream indicate the cross fader switch is in a middle or neutral position. The cross fader switch is indicated as being towards the left if both buttons are indicated as being towards a left side of their slot, and similarly the cross fader is indicated as being towards the right if both buttons are indicated as being towards a right side of their slot.

Figure 13:
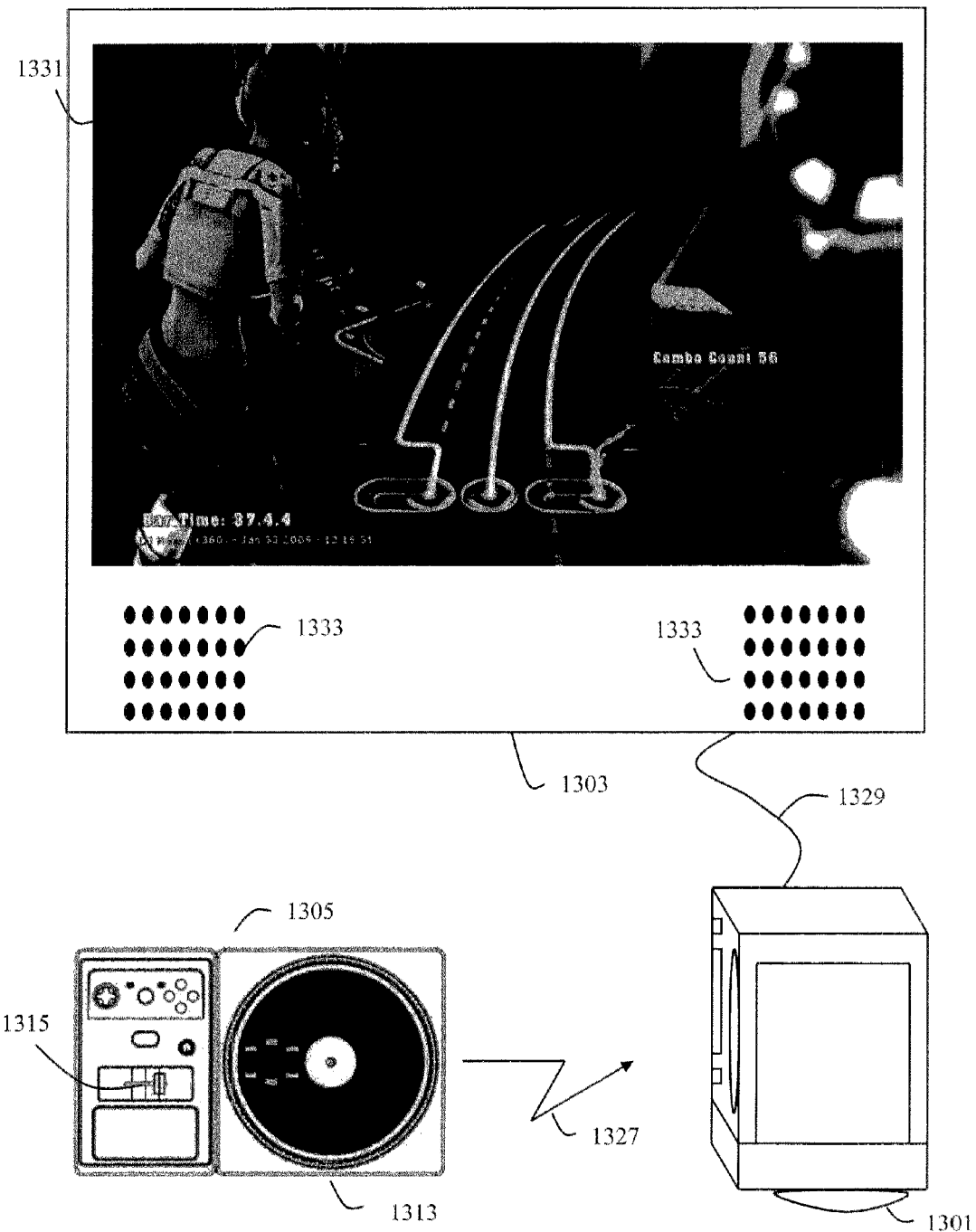
FIG. 13 illustrates a further example of a video game system in accordance with aspects of the invention.

FIG. 13 is an example of a video game system in accordance with aspects of the invention. The video game system includes a video game console 1301, a display 1303, and a controller 1305. The video game console includes internal circuitry which allows the console to run a video game by executing various program instructions related to proper execution of the video game. The video game console is coupled to the controller by a wireless connection 1327, although it should be recognized that in many embodiments the controller and video game console may be coupled by a wired connection. The controller includes a rotatable platter on a housing 1313 and a cross fader switch 1315. The video game console is also in communication with a display unit 1303, generally through an audio-video cable or similar wired connection, although a wireless connection may be used in some embodiments. The display unit is typically a television, although in some embodiments a monitor may be used, with a display screen and at least one audio output device, such as a speaker 1333.

As illustrated in FIG. 13, the display shows a screenshot of an example music-based video game. In the particular screenshot of FIG. 12, the display shows a heads up display (HUD)) highway, comprising three lines, corresponding to a left music stream, a center audio sample stream, and a right music stream. As discussed in FIG. 3, the lines corresponding to the music streams may be shown with a lateral shift. The lateral shift indicates that a cross fader input is to be moved or positioned in the direction of the shift. For example, in FIG. 13, the line for the left and right music streams show a lateral shift to the left approaching a NOW area, indicating the cross fader switch should be moved to the left. An indicator of current cross fader position is shown approximately in a NOW area. The indicator of current cross fader position is graphically illustrated in FIG. 13 as buttons in lateral slots. In the embodiment of FIG. 13, presence of the buttons in portions of the lateral slots towards the right indicate the cross fader switch as being towards the right.

Accordingly, the invention provides a disc jockey related music video game and a controller for a music video game. Although the invention has been discussed with respect to certain embodiments, it should be recognized that the invention comprises the novel and unobvious claims, and their insubstantial variations, supported by the disclosure.

The invention claimed is:

1. A music-based video game system, comprising:
a display;
a video game controller including:
a rotatable platter on a housing;
a plurality of input devices carried by the platter;
a processor configured by program instructions to command generation on the display of a visual interface of a music based video game, the program instructions including instructions for:
providing instructive cues arranged in correspondence with a musical piece on the visual interface prompting a video game player to operate the video game controller;
processing an input signal indicative of operation of the video game controller;
commanding generation of a visual interface based in part on the input signals indicative of operation of the video game controller.

2. The music-based video game system of claim 1 wherein the video game controller includes a second housing, the second housing including a plurality of input devices.

3. The music-based video game system of claim 2 wherein the second housing with the plurality of input devices includes a linear input device.

4. The music-based video game system of claim 3 wherein the visual interface comprises a plurality of visual indicators, each of the plurality of visual indicators corresponding to separate ones of a plurality of audio streams.

5. The music-based video game system of claim 4 wherein lateral shifts in the plurality of visual indicators indicate operation of the linear input device.

6. The music-based video game system of claim 5 wherein the program instructions include instructions for commanding presentation of audio of the audio streams based on position of the linear input device.

7. The music-based video game system of claim 1 wherein the housing of the video game controller comprises a first housing with the rotatable platter and a second housing with the plurality of further input devices, the first and second housings being electrically coupled.

8. The music-based video game system of claim 7 wherein the second housing has connectors on opposing sides of the second housing.

9. The music-based video game system of claim 8 wherein the first housing is couplable to the connectors on either of the opposing sides of the second housing.

10. The music-based video game system of claim 8, the video game controller further comprising a further rotatable platter on a third housing and where the first housing is coupled to connectors of one of the opposing sides of the second housing and the third housing is coupled to connectors of the other of the opposing sides.

11. The music-based video game system of claim 1 wherein the program instructions include instructions for commanding generation of a score based on extent of compliance of the video game player's inputs or series of inputs with the cues on the visual interface.

12. The music-based video game system of claim 1 wherein the plurality of input devices carried by the rotatable platter comprises a plurality of buttons.

13. The music-based video game system of claim 1 wherein the plurality of input devices carried by the rotatable platter comprises a plurality of touch-sensitive areas.

14. A music-based video game system, comprising:
a display;
a video game controller including:
a rotatable platter on a housing;
at least one input device carried by the platter;
a processor configured by program instructions to command generation on the display of a visual interface of a music based video game, the program instructions including instructions for:
providing instructive cues arranged in correspondence with a musical piece on the visual interface prompting a video game player to operate the video game controller;
processing an input signal indicative of operation of the video game controller;
commanding generation of a visual interface based in part on the input signals indicative of operation of the video game controller,
wherein the at least one input device carried by the rotatable platter comprises a plurality of touch-sensitive areas, and
wherein the housing includes circuitry for sampling the state of the plurality of touch-sensitive areas, forming a first moving average based on samples of the state of at least one of the touch sensitive areas, foaming a second moving average based on samples of the state of the at least one of the touch sensitive areas, and determining that a press of the at least one of the touch sensitive areas occurred if a difference between the first moving average and the second moving average exceeds a threshold.

15. A music-based video game system, comprising:
a display;
a video game controller including:
a turntable;
a plurality of input devices extending through a surface of the turntable;
a linear input device;
a processor configured by program instructions to command generation on the display of a visual interface of a music based video game, the program instructions including instructions for:
commanding display of instructive cues arranged in correspondence with a musical piece on the visual interface, at least some of the instructive cues prompting the video game player to manipulate the turntable, the plurality of input devices and the linear input device;
processing input signals indicative of operation of the video game controller;

commanding display of the visual interface based in part on the input signals indicative of operation of the video game controller.

16. The music-based video game system of claim 15 wherein the processor is further configured to command presentation of audio of different audio streams based on input signals indicative of position of the linear input device.

17. The music-based video game system of claim 16 wherein the linear input device comprises a knob which slides along a track on a single axis.

18. The music-based video game system of claim 16 wherein the linear input device comprises a touch sensitive strip.

19. The music-based video game system of claim 15 wherein the turntable is freely rotatable through an infinite number of degrees.

20. The music-based video game system of claim 15 wherein the turntable is rotatable through a predetermined number of degrees and returns to a neutral position upon release of the rotatable platter.

21. The music-based video game system of claim 15 wherein a rotary input device determines a position and velocity of the turntable.

22. The music-based video game system of claim 15 wherein the video game controller further includes a mixer having a plurality of input devices and a source of power.

23. The music-based video game system of claim 15 wherein the turntable has a source of power.

24. A method of simulating a multi-turntable disc jockey deck in a music-based video game with a single turntable video game controller comprising:

provyding a plurality of streams of audio data, at least two of the streams of audio data representative of different musical pieces;

selecting of the streams of audio data, or another of the streams of audio data or both of the streams of audio data for play based on an input of the video game controller having a single turntable and at least one input device carried by a platter of the single turntable, the at least one input device being configured to enable performance of an action related to the plurality of streams of audio data; and presenting at least some audio to a game player, the at least some audio formed of the selected stream or streams.

* * * * *

UNITED STATES PATENT AND TRADEMARK OFFICE
CERTIFICATE OF CORRECTION

PATENT NO. : 8,153,881 B2
APPLICATION NO. : 12/390404
DATED : April 10, 2012
INVENTOR(S) : Coppard et al.

It is certified that error appears in the above-identified patent and that said Letters Patent is hereby corrected as shown below:

In the Specifications:

In column 4, line 41, delete "and or" and insert --and/or--, therefor.

In column 4, line 56, delete "(HUT))" and insert --(HUD)--, therefor.

In column 7, line 32, delete "velocity" and insert --velocity.--, therefor.

In column 11, line 25, delete "providing" and insert --protruding--, therefor.

In column 17, line 3, delete "(HUD))" and insert --(HUD)--, therefor.

In the Claims:

In column 18, in claim 14, line 44, delete "foaming" and insert --forming--, therefor.

Signed and Sealed this
Fourth Day of December, 2012

David J. Kappos
*Director of the United States Patent and Trademark Office*